US012665655B1

(12) United States Patent
Peiffer

(10) Patent No.: US 12,665,655 B1
(45) Date of Patent: Jun. 23, 2026

(54) SCALABLE METHOD FOR DIGITAL BEAMFORMING WITHOUT CHANNEL STATE INFORMATION

(71) Applicant: Rockwell Collins, Inc., Cedar Rapids, IA (US)

(72) Inventor: Benjamin Peiffer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 30 days.

(21) Appl. No.: 19/020,376

(22) Filed: Jan. 14, 2025

Related U.S. Application Data

(60) Provisional application No. 63/621,261, filed on Jan. 16, 2024.

(51) Int. Cl.
| | |
|---|---|
| *H04L 5/12* | (2006.01) |
| *H01Q 3/26* | (2006.01) |
| *H04B 7/08* | (2006.01) |

(52) U.S. Cl.
CPC ......... *H04B 7/0857* (2013.01); *H01Q 3/2611* (2013.01)

(58) Field of Classification Search
CPC ........................... H04B 7/0857; H01Q 3/2611
USPC ................ 375/262, 260, 259, 219, 295, 316
See application file for complete search history.

(56) References Cited

U.S. PATENT DOCUMENTS

| | | | |
|---|---|---|---|
| 3,471,788 | A | 10/1969 | Bickford et al. |
| 3,864,635 | A | 2/1975 | Ewanus |

| | | | |
|---|---|---|---|
| 5,929,811 | A | 7/1999 | Rilling |
| 6,266,011 | B1 | 7/2001 | Hong |
| 6,397,083 | B2 | 5/2002 | Martin et al. |
| 6,426,973 | B1 | 7/2002 | Madhow et al. |
| 7,352,721 | B2 | 4/2008 | Kim et al. |
| 7,414,578 | B1 | 8/2008 | Courtade et al. |
| 7,570,211 | B1 | 8/2009 | Jensen et al. |
| 7,609,206 | B1 | 10/2009 | Jensen et al. |
| 7,652,577 | B1 | 1/2010 | Madhow et al. |

(Continued)

OTHER PUBLICATIONS

U.S. Appl. No. 18/242,708, filed Sep. 6, 2023, Peiffer et al.

(Continued)

*Primary Examiner* — Zewdu A Kassa
(74) *Attorney, Agent, or Firm* — Suiter Swantz IP

(57) ABSTRACT

A scalable algorithm may be used for determining beam/nullforming weights with minimal computation and minimal coordination between elements or subarrays. The algorithm may beamform large numbers of elements without channel state information and without knowing the signal of interest. The algorithm may optimize the signal-to-interference-plus-noise ratio of signals received at an array. The algorithm may remove the requirement for explicit channel state information (CSI) or for iterative co-estimation of CSI, remove the requirement for coordination with or knowledge of signals transmitted from null targets, and/or remove the requirement for knowledge of the number of targets by estimating and optimizing overall SINR, rather than jointly optimizing each received signal. The algorithm interprets the N-element arrays view of the signal-to-interference-plus-noise ratio as a N-dimensional gradient ascent. The search explores this N-D space to find a direction of ascent and applies a simultaneous search and track loop.

20 Claims, 3 Drawing Sheets

(56) References Cited

U.S. PATENT DOCUMENTS

| | | | |
|---|---|---|---|
| 7,764,224 | B1 | 7/2010 | Anderson |
| 7,916,620 | B2 | 3/2011 | Park et al. |
| 8,165,171 | B2 | 4/2012 | Preuss et al. |
| 8,170,617 | B2 | 5/2012 | Nassiri-Toussi et al. |
| 8,743,914 | B1 * | 6/2014 | Jensen .................. H04B 7/086 |
| | | | 370/537 |
| 9,262,912 | B2 | 2/2016 | Wild et al. |
| 10,074,901 | B2 | 9/2018 | Byun et al. |
| 10,158,408 | B2 | 12/2018 | Choi et al. |
| 10,291,307 | B2 | 5/2019 | Kim et al. |
| 10,305,584 | B2 | 5/2019 | Lee et al. |
| 10,468,781 | B1 | 11/2019 | Paulsen et al. |
| 10,971,815 | B1 | 4/2021 | West et al. |
| 11,217,897 | B1 | 1/2022 | West et al. |
| 11,705,974 | B2 | 7/2023 | West et al. |
| 2023/0069488 | A1 | 3/2023 | Chavez et al. |

OTHER PUBLICATIONS

Bidigare et al., "Wideband distributed transmit beamforming using channel reciprocity and relative calibration," 2015 49th Asilomar Conference on Signals, Systems and Computers, Pacific Grove, CA, USA, 2015, pp. 271-275.

Brown et al., "On the Performance of MIMO Nullforming with Random Vector Quantization Limited Feedback," in IEEE Transactions on Wireless Communications, vol. 13, No. 5, pp. 2884-2893, May 2014.

Goguri et al., "A class of scalable feedback algorithms for beam and null-forming from distributed arrays," 2016 50th Asilomar Conference on Signals, Systems and Computers, Pacific Grove, CA, USA, 2016, pp. 1447-1451.

Kumar et al., "A Scalable Feedback Mechanism for Distributed Nullforming With PhaseOnly Adaptation," in IEEE Transactions on Signal and Information Processing over Networks, vol. 1, No. 1, pp. 58-70, Mar. 2015.

Kumar et al., "Distributed MIMO Multicast With Protected Receivers: A Scalable Algorithm for Joint Beamforming and Nullforming," in IEEE Transactions on Wireless Communications, vol. 16, No. 1, pp. 512-525, Jan. 2017.

Kumar et al., "Scalable algorithms for joint beam and null-forming using distributed antenna arrays," 2014 IEEE Global Communications Conference, Austin, TX, USA, 2014, pp. 4042-4047.

Peiffer et al., "Experimental demonstration of nullforming from a fully wireless distributed array," 2017 IEEE International Conference on Acoustics, Speech and Signal Processing (ICASSP), New Orleans, LA, 2017, pp. 3694-3698.

* cited by examiner

SCALABLE METHOD FOR DIGITAL BEAMFORMING WITHOUT CHANNEL STATE INFORMATION

CROSS-REFERENCE TO RELATED APPLICATIONS

The present application claims the benefit under 35 U.S.C. § 119(e) of U.S. Provisional Application Ser. No. 63/621,261, filed Jan. 16, 2024, titled "A SCALABLE METHOD FOR DIGITAL BEAMFORMING WITHOUT CHANNEL STATE INFORMATION", which is incorporated herein by reference in the entirety.

TECHNICAL FIELD

The present disclosure generally relates to radio systems, and more specifically to diversity systems.

BACKGROUND

Adaptive digital beamforming/nullforming algorithms inherently lack scalability because inversion of large covariance matrices is computationally expensive. The dominating factor of the algorithms is the covariance matrix inversion. For an N-element array, the matrix inversion may require a complexity of $N^3$.

Distributed computing methods that rely on common feedback are inherently scalable—allowing much larger phased-arrays to be constructed. Important characteristics of existing scalable beam/nullforming algorithms include: (1) elements of the phased-array or virtual antenna array (VAA) operate with little or no coordination amongst themselves, (2) elements rely on some form of objective function to determine whether beam/nullforming was successful, (3), elements rely on one or more common feedback signals to indicate the status of the objective function, (4) elements independently, iteratively adapt in response to the objective function, (5) computational complexity of each iteration is extremely simple, often including only a few multiplications and additions, (6) due to the reliance on feedback signals, the running time of the algorithm depends heavily on the latency of feedback, and (7) the precise definition of the objective function and method of adaptation makes each member of this class of algorithm unique.

Some algorithms, rely on explicit channel state information (CSI) from each element to each target. The channel state information is the information that the covariance matrix would represent. The algorithms rely on having the channel state information provided may determine the channel state information cooperatively. The beamforming target measures the channel state information and then sends the channel state information for use in the iterative algorithm.

Some algorithms, require CSI but provide a mechanism for joint-estimation/adaptation of CSI and beamforming weights. Estimation of CSI and calculation feedback signals often requires knowledge of the signal of interest. The signal of interest knowledge may be available for a beam target (i.e. a known preamble sequence and a known frequency assignment for a desired communication link). The signal of interest may be unavailable for a null target (i.e. an unknown interfering signal in a congested metropolitan area). The class of algorithm described above is advantageous for large numbers of elements and targets, however typical implementations have relied on coordination with beam/null targets in determining CSI and calculation of the feedback.

As radio frequency (RF) spectrum resource utilization increases, radios access higher frequencies and higher instantaneous bandwidths (IBW). Higher path loss at higher frequencies dictates the use of highly directional communication systems with higher beamforming gain and the ability to adaptively null many interfering signals. More beamforming gain requires more elements in an array while maintaining smaller lattice spacing at the shorter wavelengths required for these higher frequency systems. Existing digital beamforming algorithms have complexity on the order of at least $O(n^3)$ and therefore do not scale with the large number of elements required in massive phased-arrays.

Therefore, it would be advantageous to provide a device, system, and method that cures the shortcomings described above.

SUMMARY

In some aspects, the techniques described herein relate to an adaptive digital beamformer including: N-number of analog-to-digital converters (ADC0 to ADCN−1), wherein the N-number of analog-to-digital converters (ADC0 to ADCN−1) are configured to generate N-number of in-phase and quadrature signals (s0(t) to sN−1(t)); a search loop, wherein the search loop is configured to multiply the in-phase and quadrature signals (s0(t) to sN−1(t)) with search gains (gS,0[k] to gS,N−1[k]), wherein the search gains (gS,0[k] to gS,N−1[k]) are complex gains based on search phases (ΘS,0[k] to ΘS,N−1[k]), wherein subsequent search phases (ΘS,0[k+1] to ΘS,N−1[k+1]) are defined by the search phases (ΘS,0[k] to ΘS,N−1[k]) plus a product of search step directions (DS,0[k] to DS,N−1[k]) and a search phase precision (φS[k]), wherein the search loop is configured to determine a search signal-to-interference-plus-noise ratio (SINRS[k]), and a track loop, wherein the track loop is configured to multiply the in-phase and quadrature signals (s0(t) to sN−1(t)) with track gains (gT,0[k] to gT,N−1[k]), wherein the track gains (gT,0[k] to gT,N−1[k]) are based on track phases (ΘT,0[k] to ΘT,N−1[k]), wherein subsequent track phases (ΘT,0[k+1] to ΘT,N−1[k+1]) are defined by the track phases (ΘT,0[k] to ΘT,N−1[k]) plus a product of track step directions (DT,0[k] to DT,N−1[k]) and a track phase precision (φT), wherein the track loop is configured to determine a track signal-to-interference-plus-noise ratio (SINRT[k]); wherein the search step directions (DS,0[k] to DS,N−1[k]) and the track step directions (DT,0[k] to DT,N−1[k]) are random discrete variables, wherein the search loop is configured to update the subsequent search phases (ΘS, 0[k+1] to ΘS,N−1[k+1]) and the search step directions (DS,0[k] to DS,N−1[k]) and the track loop is configured to update the subsequent track phases (ΘT,0[k+1] to ΘT,N−1[k+1]) and the track step directions (DT,0[k] to DT,N−1[k]) using the search signal-to-interference-plus-noise ratio (SINRS[k]) and the track signal-to-interference-plus-noise ratio (SINRT[k]) as feedback.

In some aspects, the techniques described herein relate to a radio system including: an adaptive digital beamformer including: N-number of analog-to-digital converters (ADC0 to ADCN−1), wherein the N-number of analog-to-digital converters (ADC0 to ADCN−1) are configured to generate N-number of in-phase and quadrature signals (s0(t) to sN−1(t)); a search loop, wherein the search loop is configured to multiply the in-phase and quadrature signals (s0(t) to sN−1(t)) with search gains (gS,0[k] to gS,N−1[k]), wherein the search gains (gS,0[k] to gS,N−1[k]) are complex gains based on search phases (ΘS,0[k] to ΘS,N−1[k]), wherein subsequent search phases (ΘS,0[k+1] to ΘS,N−1[k+1]) are defined by the search phases ($\Theta$S,0[k] to $\Theta$S,N−1[k]) plus a product of search step directions (DS,0[k] to DS,N−1[k]) and a search phase precision ($\varphi$S[k]), wherein the search loop is configured to determine a search signal-to-interference-plus-noise ratio (SINRS[k]), and a track loop, wherein the track loop is configured to multiply the in-phase and quadrature signals (s0(t) to sN−1(t)) with track gains (gT,0 [k] to gT,N−1[k]), wherein the track gains (gT,0[k] to gT,N−1[k]) are based on track phases ($\Theta$T,0[k] to $\Theta$T,N−1 [k]), wherein subsequent track phases ($\Theta$T,0[k+1] to $\Theta$T,N−1[k+1]) are defined by the track phases ($\Theta$T,0[k] to $\Theta$T,N−1[k]) plus a product of track step directions (DT,0[k] to DT,N−1[k]) and a track phase precision ($\varphi$T), wherein the track loop is configured to determine a track signal-to-interference-plus-noise ratio (SINRT[k]); wherein the search step directions (DS,0[k] to DS,N−1[k]) and the track step directions (DT,0[k] to DT,N−1[k]) are random discrete variables, wherein the search loop is configured to update the subsequent search phases ($\Theta$S,0[k+1] to $\Theta$S,N−1[k+1]) and the search step directions (DS,0[k] to DS,N−1[k]) and the track loop is configured to update the subsequent track phases ($\Theta$T,0[k+1] to $\Theta$T,N−1[k+1]) and the track step directions (DT,0[k] to DT,N−1[k]) using the search signal-to-interference-plus-noise ratio (SINRS[k]) and the track signal-to-interference-plus-noise ratio (SINRT[k]) as feedback.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
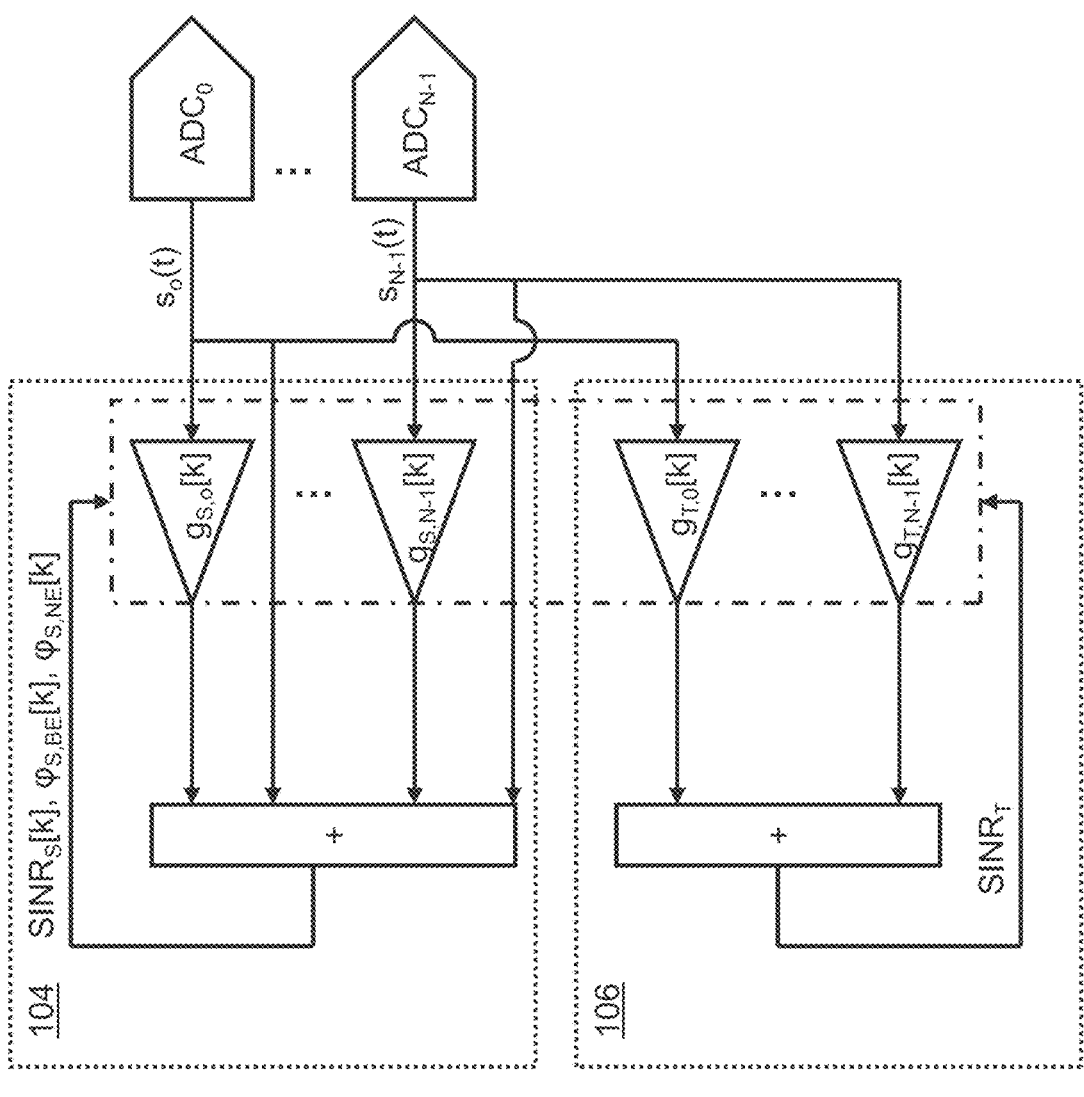
FIG. 1 depicts an adaptive digital beamformer, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

LISTING OF TERMS

Analog-to-digital converter ($ADC_0$ to $ADC_{N-1}$)
Combined digital signal (s(t))
In-phase and quadrature signal ($s_0$(t) to $s_{N-1}$(t))
Input signal power ($S_{IN}$[k])
Input interference power ($I_{IN}$[k])
Search phase-adjusted-signal power ($S_S$[k])
Search phase-adjusted-interference power ($I_S$[k]),
Search signal-to-interference-plus-noise ratio ($SINR_S$[k])
Search gains ($g_{S,0}$[k] to $g_{S,N-1}$[k])
Search phases ($\Theta_{S,0}$[k] to $\Theta_{S,N-1}$[k])
Search step directions ($D_{S,0}$[k] to $D_{S,N-1}$[k])
Search phase precision ($\varphi_S$[k])
Search beamforming error ($\varphi_{S,BE}$[k])
Search nullforming error ($\varphi_{S,NE}$[k])
Track phase-adjusted-signal power ($S_T$[k])
Track phase-adjusted-interference power ($I_T$[k])
Track signal-to-interference-plus-noise ratio ($SINR_T$[k])
Track gains ($g_{T,0}$[k] to $g_{T,N-1}$[k])
Track phases ($\Theta_{T,0}$[k] to $\Theta_{T,N-1}$[k])
Track step directions ($D_{T,0}$[k] to $D_{T,N-1}$[k])
Track phase precision ($\varphi$T)
Time (t)
Angular wavenumber [k]
Reference will now be made in detail to the subject matter disclosed, which is illustrated in the accompanying drawings. Embodiments of the present disclosure are directed to a scalable method for digital beamforming without channel state information. A scalable algorithm may be used for determining beam/nullforming weights with minimal computation and minimal coordination between elements or subarrays. The algorithm may beamform large numbers of elements without channel state information and without knowing the signal of interest. The algorithm may optimize the signal-to-interference-plus-noise ratio of signals received at an array. The algorithm may remove the requirement for explicit channel state information (CSI) or for iterative co-estimation of CSI, remove the requirement for coordination with or knowledge of signals transmitted from null targets, and/or remove the requirement for knowledge of the number of targets by estimating and optimizing overall SINR, rather than jointly optimizing each received signal. The algorithm interprets the N-element arrays view of the signal-to-interference-plus-noise ratio as a N-dimensional gradient ascent. The search explores this N-D space to find a direction of ascent and applies a simultaneous search and track loop.

U.S. Pat. No. 7,652,577B1, titled "Systems and methods of beamforming in radio frequency identification applications"; U.S. Pat. No. 7,414,578B1, titled "Method for efficiently computing the beamforming weights for a large antenna array"; U.S. Pat. No. 7,570,211B1, titled "Digital beamforming method and apparatus for pointing and null steering without calibration or calculation of covariance matrix"; U.S. patent application Ser. No. 18/242,708, titled "SYSTEM FOR SCALABLE ADAPTIVE DIGITAL BEAMFORMING IN A PHASED ANTENNA-ARRAY"; are incorporated herein by reference in the entirety.

FIG. 1 depicts an adaptive digital beamformer 100, in accordance with one or more embodiments of the present disclosure.

The adaptive digital beamformer 100 may include N-number of analog-to-digital converters ($ADC_0$ to $ADC_{N-1}$), where N is an integer number of at least two. The analog-to-digital converters ($ADC_0$ to $ADC_{N-1}$) may be configured to generate N-number of in-phase and quadrature signals ($s_0(t)$ to $s_{N-1}(t)$). Each of the analog-to-digital converters ($ADC_0$ to $ADC_{N-1}$) may generate respective of the in-phase and quadrature signals ($s_0(t)$ to $s_{N-1}(t)$). For example, the first analog-to-digital converters ($ADC_0$) may generate the first in-phase and quadrature signal ($s_0(t)$) and so on through to the last analog-to-digital converters ($ADC_{N-1}$) generating the last in-phase and quadrature signals ($s_{N-1}(t)$).

The in-phase and quadrature signals ($s_0(t)$ to $s_{N-1}(t)$) may be digital signals, such that the adaptive digital beamformer 100 may perform adaptive beamforming in the digital domain. The in-phase and quadrature signals ($s_0(t)$ to $s_{N-1}(t)$) may each include an in-phase and a quadrature component.

The adaptive digital beamformer 100 may be configured to form B-number of beams and M-number of nulls, where the sum of the B-number of beams and the M-number of nulls is at most one less than the N-number of in-phase and quadrature signals ($s_0(t)$ to $s_{N-1}(t)$). The beams may be pointed at the target to be received. The nulls may be pointed at targets to be nulled.

The adaptive digital beamformer 100 may include one or more loops. For example, the adaptive digital beamformer 100 may include search loops 104 and/or track loops 106. The adaptive digital beamformer 100 may parallelize multiple of the search loops 104 and/or track loops 106, where the computational capability of the adaptive digital beamformer 100 permits.

The search loop 104 and/or the track loop 106 may determine an input signal power ($S_{IN}[k]$) and an input interference power ($I_{IN}[k]$). For example, the search loop 104 may determine the input signal power ($S_{IN}[k]$) and the input interference power ($I_{IN}[k]$) for use in computations, as will be described further herein. The input signal power ($S_{IN}[k]$) may be the power of the first in-phase and quadrature signals ($s_0(t)$) and the input interference power ($I_{IN}[k]$)) may be the power of the remainder of the in-phase and quadrature signals ($s_1(t)$ to $s_{N-1}(t)$). The input signal power ($S_{IN}[k]$) may be defined by the square root of the sum of the square of the absolute value of the first of the in-phase and quadrature signals. Similarly, the input interference power ($I_{IN}[k]$) may be defined by the square root of the sum of square of the absolute value of the remainder of the in-phase and quadrature signals. For example, the input signal power ($S_{IN}[k]$) and the input interference power ($I_{IN}[k]$) may be defined by the following equations:

$$S_{IN}[k] = \sqrt{\sum \|s_0(t)\|^2}$$

$$I_{IN}[k] = \sqrt{\sum_{i=1}^{N-1} -\|s_i(t)\|^2}$$

The search loop 104 may also determine a search phase-adjusted-signal power ($S_S[k]$), a search phase-adjusted-interference power ($I_S[k]$), a search signal-to-interference-plus-noise ratio ($SINR_S[k]$), a search beamforming error ($\varphi_{S,BE}[k]$), and/or a search nullforming error ($\varphi_{S,NE}[k]$). The track loop 106 may also determine a track phase-adjusted-signal power ($S_T[k]$), a track phase-adjusted-interference power ($I_T[k]$), and/or a track signal-to-interference-plus-noise ratio ($SINR_T[k]$).

The search loop 104 and/or the track loop 106 may be configured to phase adjust the in-phase and quadrature signals ($s_0(t)$ to $s_{N-1}(t)$). The search loop 104 may multiply the in-phase and quadrature signals ($s_0(t)$ to $s_{N-1}(t)$) with search gains ($g_{S,0}[k]$ to $g_{S,N-1}[k]$), respectively. Similarly, the track loop 106 may multiply the in-phase and quadrature signals ($s_0(t)$ to $s_{N-1}(t)$) with track gains ($g_{T,0}[k]$ to $g_{T,N-1}[k]$), respectively.

The search gains ($g_{S,0}[k]$ to $g_{S,N-1}[k]$) and the track gains ($g_{T,0}[k]$ to $g_{T,N-1}[k]$) may be a complex gain from Euler's formula defined by search phases ($\Theta_{S,0}[k]$ to $\Theta_{S,N-1}[k]$) and track phases ($\Theta_{T,0}[k]$ to $\Theta_{T,N-1}[k]$), respectively. For example, the search gains ($g_{S,0}[k]$ to $g_{S,N-1}[k]$) and the track gains ($g_{T,0}[k]$ to $g_{T,N-1}[k]$) may be defined by the following formulas, where i is from 0 to N−1 and where j is the imaginary number.

$$g_{S,i}[k] = e^{j\Theta_{S,i}[k]}$$

$$g_{T,i}[k] = e^{j\Theta_{T,i}[k]}$$

Notably, the magnitude of the search gains ($g_{S,0}[k]$ to $g_{S,N-1}[k]$) and the track gains ($g_{T,0}[k]$ to $g_{T,N-1}[k]$) is not adjusted by an operator outside of the exponent term, such that phase adjustments and not magnitude adjustments are performed on the in-phase and quadrature signals ($s_0(t)$ to $s_{N-1}(t)$) in the search loop 104 and the track loop 106. Simulations experimentally indicate the random direction is faster and more reliable than adjusting the magnitude.

The search phases ($\Theta_{S,0}[k]$ to $\Theta_{S,N-1}[k]$) and the track phases ($\Theta_{T,0}[k]$ to $\Theta_{T,N-1}[k]$) may be bound in a state-space from U[$-\pi$, $\pi$].

Subsequent search phases ($\Theta_{S,0}[k+1]$ to $\Theta_{S,N-1}[k+1]$) may be defined by the search phases ($\Theta_{S,0}[k]$ to $\Theta_{S,N-1}[k]$) plus the product of search step directions ($D_{S,0}[k]$ to $D_{S,N-1}[k]$) and a search phase precision ($\varphi_S[k]$). Similarly, subsequent track phases ($\Theta_{T,0}[k+1]$ to $\Theta_{T,N-1}[k+1]$) may be defined by the track phases ($\Theta_{T,0}[k]$ to $\Theta_{T,N-1}[k]$) plus the product of track step directions ($D_{T,0}[k]$ to $D_{T,N-1}[k]$) and a track phase precision ($\varphi_T$). For example, the subsequent search phases ($\Theta_{S,0}[k+1]$ to $\Theta_{S,N-1}[k+1]$) and the subsequent track phases ($\Theta_{T,0}[k+1]$ to $\Theta_{T,N-1}[k+1]$) may be defined by the following formulas, where i is from 0 to N–1.

$$\Theta_{S,i}[k+1] = \Theta_{S,i}[k] + D_{S,i} * \varphi_S[k]$$

$$\Theta_{T,i}[k+1] = \Theta_{T,i}[k] + D_{T,i} * \varphi_T$$

The search step directions ($D_{S,0}[k]$ to $D_{S,N-1}[k]$) and the track step directions ($D_{T,0}[k]$ to $D_{T,N-1}[k]$) may each be random discrete variables chosen from the set of {–1, 0, or 1}. The search step directions ($D_{S,0}[k]$ to $D_{S,N-1}[k]$) and the track step directions ($D_{T,0}[k]$ to $D_{T,N-1}[k]$) may be thought of as a cardinal direction for a search and track step.

The search phase precision ($\varphi_S[k]$) may be the same for each of the search gains ($g_{S,0}[k]$ to $g_{S,N-1}[k]$). Similarly, the track phase precision ($\varphi_T$) may be the same for each of the track gains ($g_{T,0}[k]$ to $g_{T,N-1}[k]$). The phase adjustment performed by the search loop 104 may be larger than the phase adjustment performed by the track loop 106. For example, the search phase precision ($\varphi_S[k]$) may be larger than the track phase precision ($\varphi_T$). The search phase precision ($\varphi_S[k]$) and track phase precision ($\varphi_T$) may be a phase precision to which the search loop 104 and the track loop 106, respectively, will converge. The search phase precision ($\varphi_S[k]$) may be greater than the track phase precision ($\varphi_T$), such that the search loop 104 may find gradients more quickly than the track loop 106 while the track loop 106 may find peaks of gradients which may not be found by the search loop 104. The search phase precision ($\varphi_S[k]$) may also be sufficiently large to jump between gradients, to prevent the search loop 104 from getting stuck in a local maximum.

The search phase-adjusted-signal power ($S_S[k]$) and the track phase-adjusted-signal power ($S_T[k]$) may be the power of the first in-phase and quadrature signals ($s_0(t)$) after phase adjustment by the first search gain ($g_{S,0}[k]$) and after phase adjustment by the first track gain ($g_{T,0}[k]$), respectively. The search phase-adjusted-signal power ($S_S[k]$) and the track phase-adjusted-signal power ($S_T[k]$) may be defined by the square root of the sum of the square of the absolute value of the first of the in-phase and quadrature signals ($s_0(t)$) times the first of the search gains ($g_{S,0}[k]$) and the first of the track gains ($g_{S,0}[k]$), respectively. For example, the search phase-adjusted-signal power ($S_S[k]$) and the track phase-adjusted-signal power ($S_T[k]$) may be defined by the following equations:

$$S_S[k] = \sqrt{\sum \|(s_0(t) * g_{S,0}(t))\|^2}$$

$$S_T[k] = \sqrt{\sum \|(s_0(t) * g_{T,0}(t))\|^2}$$

The search phase-adjusted-interference power ($I_S[K]$) and the track phase-adjusted-interference power ($I_T[k]$) may be the power of the remainder of the in-phase and quadrature signals ($s_1(t)$ to $s_{N-1}(t)$) after phase adjustment by the remainder of the search gains ($g_{S,1}[k]$ to $g_{S,N-1}[k]$) and the remainder of the track gains ($g_{T,1}[k]$ to $g_{T,N-1}[k]$), respectively. The search phase-adjusted-interference power ($I_S[K]$) and the track phase-adjusted-interference power ($I_T[k]$) may be defined by the square root of the sum of square of the absolute value of the remainder of the in-phase and quadrature signals ($s_1(t)$ to $s_{N-1}(t)$) times the remainder of the search gains ($g_{S,1}[k]$ to $g_{S,N-1}[k]$) and times the remainder of the track gains ($g_{T,1}[k]$ to $g_{T,N-1}[k]$), respectively. For example, the search phase-adjusted-interference power ($I_S[K]$) and the track phase-adjusted-interference power ($I_T[k]$) may be defined by the following equations:

$$I_S[k] = \sqrt{\sum_{i=1}^{N-1} \|(s_i(t) * g_{S,i}(t))\|^2}$$

$$I_T[k] = \sqrt{\sum_{i=1}^{N-1} \|(s_i(t) * g_{T,i}(t))\|^2}$$

The search signal-to-interference-plus-noise ratio ($SINR_S[k]$) and the track signal-to-interference-plus-noise ratio ($SINR_T[k]$) may be the search phase-adjusted-signal power ($S_S[k]$) divided by the search phase-adjusted-interference power ($I_S[K]$) and the track phase-adjusted-signal power ($S_T[k]$) divided by the track phase-adjusted-interference power ($I_T[k]$), respectively. For example, the search signal-to-interference-plus-noise ratio ($SINR_S[k]$) and the track signal-to-interference-plus-noise ratio ($SINR_T[k]$) may be defined by the following equation:

$$SINR_S = S_S/I_S$$

$$SINR_T = S_T/I_T$$

Notably, the search signal-to-interference-plus-noise ratio ($SINR_S[k]$) and the track signal-to-interference-plus-noise ratio ($SINR_T[k]$) may be determined without measuring channel state information and without measuring the interfering signals to be nulled.

The search beamforming error ($\varphi_{BE}[k]$) and the search nullforming error ($\varphi_{NE}[k]$) may be defined by the real components and imaginary components, respectively, of the quotient of the phase adjusted powers during search over the input powers. For example, the search beamforming error ($\varphi_{BE}[k]$) may be defined by the real components of the quotient of the search phase-adjusted-signal power ($S_S[k]$) over the input signal power ($S_{IN}[k]$). By way of another example, the search nullforming error ($\varphi_{NE}[k]$) may be defined by the imaginary components of the quotient of the search phase-adjusted-interference power ($I_S[K]$) over the input interference power ($I_{IN}[k]$). The search beamforming error ($\varphi_{BE}[k]$) and the search nullforming error ($\varphi_{NE}[k]$) may also be normalized to the N-number of the in-phase and quadrature signals ($s_0(t)$ to $s_{N-1}(t)$). Normalizing the search beamforming error ($\varphi_{BE}[k]$) and the search nullforming error ($\varphi_{NE}[k]$) may limit the sensitivity of the adaptive digital beamformer 100. The search beamforming error ($\varphi_{BE}[k]$) and the search nullforming error ($\varphi_{NE}[k]$) may be normalized with respect to the average amplitude of one or more signals during the sample window. The search beamforming error ($\varphi_{BE}[k]$) may be defined by the inverse cosine of the search phase-adjusted-signal power ($S_S$[k]) divided by the product of the input signal power ($S_{IN}$[k]) and the number N. Similarly, the search nullforming error ($\varphi_{NE}$[k]) may be defined by the inverse sine of the search phase-adjusted-interference power ($I_S$[K]) divided by the product of the input interference power ($I_{IN}$[k]) and the number N. For example, the search beamforming error ($\varphi_{BE}$[k]) and the search nullforming error ($\varphi_{NE}$[k]) may be defined by the following equations:

$$\varphi_{BE} = \cos^{-1}\left(S_S/(S_{IN} * N)\right)$$

$$\varphi_{NE} = \sin^{-1}\left(I_S/(I_{IN} * N)\right)$$

The search beamforming error ($\varphi_{BE}$[k]) and the search nullforming error ($\varphi_{NE}$[k]) may not be computed during track.

The in-phase and quadrature signals ($s_0$(t) to $s_{N-1}$(t)) may vary as a function of time (t).

The input signal power (SIN[k]), the input interference power (IIN[k]), the search phase-adjusted-signal power (SS [k]), the search phase-adjusted-interference power (IS[k]), the search signal-to-interference-plus-noise ratio (SINRS [k]), the search gains (gS,0[k] to gS,N−1[k]), the search phases (ΘS,0[k] to ΘS,N−1[k]), the search step directions (DS,0[k] to DS,N−1[k]), the search phase precision (φS[k]), the search beamforming error (φS,BE[k]), the search nullforming error (φS,NE[k]), the track phase-adjusted-signal power (ST[k]), the track phase-adjusted-interference power (IT[k]), the track signal-to-interference-plus-noise ratio (SINRT[k]), the track gains (gT,0[k] to gT,N−1[k]), the track phases (ΘT,0[k] to ΘT,N−1[k]), and/or the track step directions (DT,0[k] to DT,N−1[k]) may vary as a function of angular wavenumber [k].

The search signal-to-interference-plus-noise ratio ($SINR_S$ [k]), the track signal-to-interference-plus-noise ratio ($SINR_T$ [k]), the search beamforming error ($\varphi_{BE}$[k]), and/or the search nullforming error ($\varphi_{NE}$[k]) may be used as a common feedback (r[k]) to adjust the search gains ($g_{S,0}$[k] to $g_{S,N-1}$ [k]) in the search loop 104 and/or the track gains ($g_{T,0}$[k] to $g_{T,N-1}$[k]) in the track loop 106, in a subsequent angular wavenumber [k+1]. The common feedback (r[k]) may also be referred to as an aggregate complex channel gain. For example, the search gains ($g_{S,0}$[k] to $g_{S,N-1}$[k]) and the track gains ($g_{T,0}$[k] to $g_{T,N-1}$[k]) may be updated as described with reference to the method 200. The search loop 104 and the track loop 106 may run in parallel and receive the search signal-to-interference-plus-noise ratio ($SINR_S$[k]), the track signal-to-interference-plus-noise ratio ($SINR_T$[k]), the search beamforming error ($\varphi_{BE}$[k]), and/or the search nullforming error ($\varphi_{NE}$[k]) as the common feedback.

Figure 2:
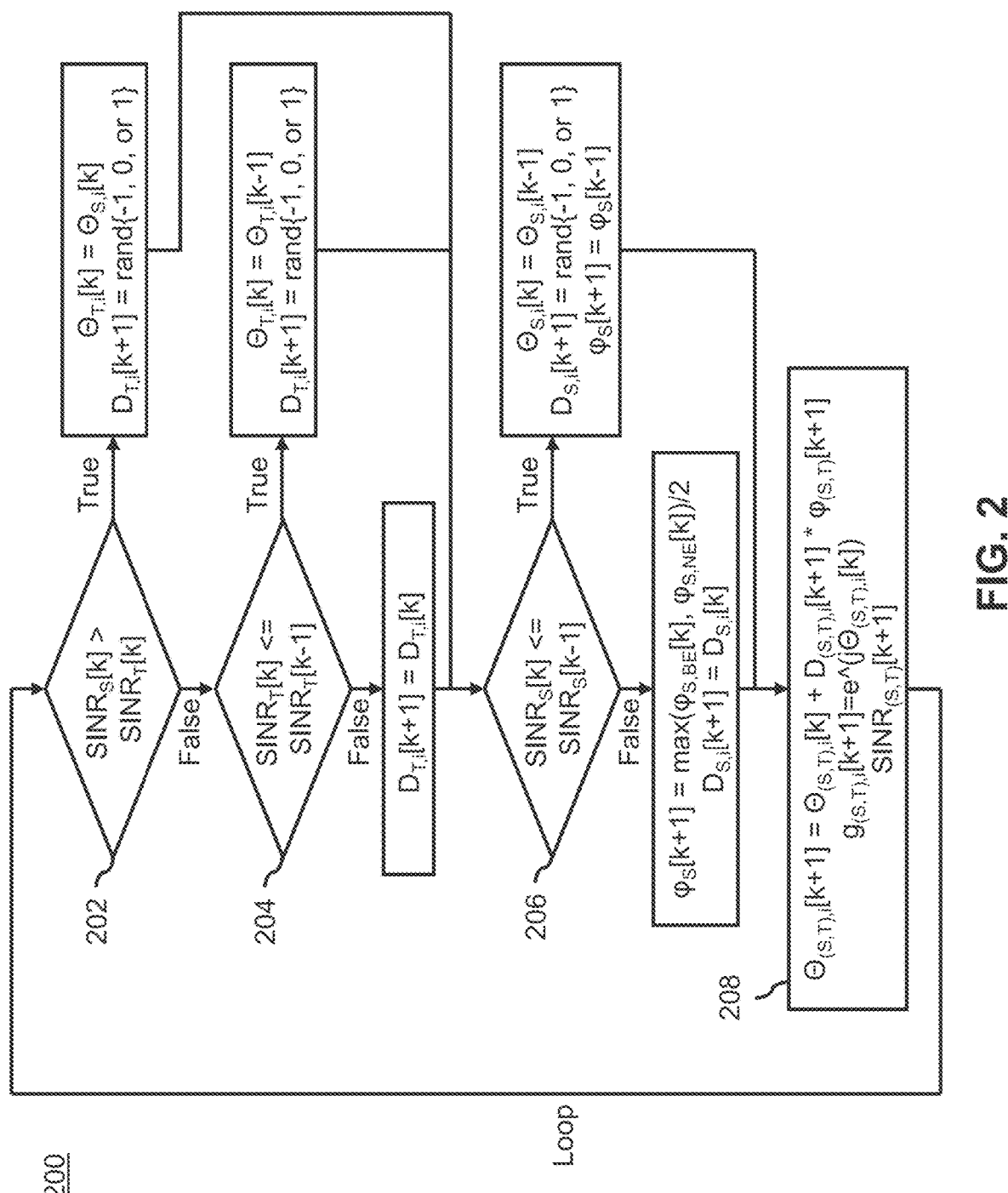
FIG. 2 depicts a flow diagram of a method, in accordance with one or more embodiments of the present disclosure.

FIG. 2 depicts a flow diagram of a method 200, in accordance with one or more embodiments of the present disclosure. The method 200 is a method of digital beamforming. The embodiments and enabling technologies described previously herein in the context of the adaptive digital beamformer 100, the search loop 104, and the track loop 106 should be interpreted to extend to method 200. For example, the adaptive digital beamformer 100, the search loop 104, and/or the track loop 106 may perform the method 200. It is further noted, however, that the method is not limited to the architecture of the adaptive digital beamformer 100, the search loop 104, and the track loop 106.

In a step 202, the search signal-to-interference-plus-noise ratio ($SINR_S$[k]) may be compared against the track signal-to-interference-plus-noise ratio ($SINR_T$[k]).

If the search signal-to-interference-plus-noise ratio ($SINR_S$[k]) is greater than the track signal-to-interference-plus-noise ratio ($SINR_T$[k]), then the search loop 104 is performing better than the track loop 106. The track loop 106 will update the track phases ($\Theta_{T,0}$[k] to $\Theta_{T,N-1}$[k]) and the subsequent track step directions ($D_{T,0}$[k+1] to $D_{T,N-1}$[k+1]) if at any time the search loop 104 the search signal-to-interference-plus-noise ratio ($SINR_S$[k]) is greater than the track signal-to-interference-plus-noise ratio ($SINR_T$[k]) for the track loop 106. The track phases ($\Theta_{T,0}$[k] to $\Theta_{T,N-1}$[k]) may be set to respective of the search phases ($\Theta_{S,0}$[k] to $\Theta_{S,N-1}$[k]) and/or the subsequent track step directions ($D_{T,0}$[k+1] to $D_{T,N-1}$[k+1]) may be set to new random discrete variables of {−1, 0, or 1}. The method 200 may then proceed to the step 206. The track loop 106 does not need to be updated if performing better than the search loop 104, such that the step 204 may be skipped.

If the search signal-to-interference-plus-noise ratio ($SINR_S$[k]) is not greater than the track signal-to-interference-plus-noise ratio ($SINR_T$[k]), then the track loop 106 is performing better than or the same as the search loop 104. Thus, the track loop 106 may comparing performances with the search loop 104 before making an update decision. The method 200 may then proceed to the step 204.

In a step 204, the track signal-to-interference-plus-noise ratio ($SINR_T$[k]) may be compared against the previous track signal-to-interference-plus-noise ratio ($SINR_T$[k−1]).

If the track signal-to-interference-plus-noise ratio ($SINR_T$ [k]) is less than or equal to the previous track signal-to-interference-plus-noise ratio ($SINR_T$[k−1]), then the track loop 106 has traversed away from the gradient and the track loop 106 may update the track phases ($\Theta_{T,0}$[k] to $\Theta_{T,N-1}$[k]) and the subsequent track step directions ($D_{T,0}$[k+1] to $D_{T,N-1}$[k+1]). The track phases ($\Theta_{T,0}$[k] to $\Theta_{T,N-1}$[k]) may be set to respective of the previous track phases ($\Theta_{T,0}$[k−1] to $\Theta_{T,N-1}$[k−1]) and/or the subsequent track step directions ($D_{T,0}$[k+1] to $D_{T,N-1}$[k+1]) may be set to new random discrete variables of {−1, 0, or 1}. The track step directions ($D_{T,0}$[k] to $D_{T,N-1}$[k]) may be updated each time the track loop 106 traverses away from the gradient. Backtracking the track loop 106 may be more efficient than randomizing the track phases ($\Theta_{T,0}$[k] to $\Theta_{T,N-1}$[k]). The previous, incorrect step has been removed by using the value of previous track phases ($\Theta_{T,0}$[k−1] to $\Theta_{T,N-1}$[k−1]) as a starting point from which to step using the new random discrete variables of {−1, 0, or 1}. This assumes one cycle feedback latency, for larger latencies a larger search history must be kept so older steps can be returned to. The method 200 may then proceed to the step 206.

If the track signal-to-interference-plus-noise ratio ($SINR_T$ [k]) is not less than or equal to the previous track signal-to-interference-plus-noise ratio ($SINR_T$[k−1]), then the track loop 106 has traversed towards the gradient and the track loop 106 may update the subsequent track step directions ($D_{T,0}$[k+1] to $D_{T,N-1}$[k+1]). The subsequent track step directions ($D_{T,0}$[k+1] to $D_{T,N-1}$[k+1]) may be set to the track step directions ($D_{T,0}$[k] to $D_{T,N-1}$[k]). The track step directions ($D_{T,0}$[k] to $D_{T,N-1}$[k]) and all subsequent track step directions may remain the same until the track loop 106 no longer traverses towards the gradient. The method 200 may then proceed to the step 206.

In a step 206, the search signal-to-interference-plus-noise ratio ($SINR_S$[k]) may be compared against the previous search signal-to-interference-plus-noise ratio ($SINR_S$[k−1]).

If the search signal-to-interference-plus-noise ratio (SINR$_S$[k]) is less than or equal to the previous search signal-to-interference-plus-noise ratio (SINR$_S$[k−1]), then the search loop 104 has traversed away from the gradient and the search loop 104 may update the search phases ($\Theta_{S,0}$[k] to $\Theta_{S,N-1}$[k]), the subsequent search step directions (D$_{S,0}$[k+1] to D$_{S,N-1}$[k+1]), and/or the subsequent search phase precision ($\varphi_S$[k+1]). The search phases ($\Theta_{S,0}$[k] to $\Theta_{S,N-1}$[k]) may be set to respective of the previous search phases ($\Theta_{S,0}$[k−1] to $\Theta_{S,N-1}$[k−1]). The subsequent search step directions (D$_{S,0}$[k+1] to D$_{S,N-1}$[k+1]) may be set to new random discrete variables of {−1, 0, or 1}. The subsequent search phase precision ($\varphi_S$[k+1]) may be set to the previous phase precision ($\varphi_S$[k−1]). The method 200 may then proceed to the step 208.

If the search signal-to-interference-plus-noise ratio (SINR$_S$[k]) is not less than or equal to the previous search signal-to-interference-plus-noise ratio (SINR$_S$[k−1]), then the search loop 104 has traversed towards from the gradient, the subsequent search phase precision ($\varphi_S$[k+1]) may be updated, and the subsequent search step directions (D$_{S,0}$[k+1] to D$_{S,N-1}$[k+1]) may remain the same as the search step directions (D$_{S,0}$[k] to D$_{S,N-1}$[k]). The subsequent search phase precision ($\varphi_S$[k+1]) may be updated based on the maximum of the search beamforming error ($\varphi_{S,BE}$[k]) and the search nullforming error ($\varphi_{S,NE}$[k]). For example, the subsequent search phase precision ($\varphi_S$[k+1]) may be defined by the following formula:

$$\varphi_S[k+1] = \max(\varphi_{S,BE}[k], \varphi_{S,NE}[k])/2$$

The subsequent search phase precision ($\varphi_S$[k+1]) may also be maintained at one or more orders of magnitude above the track phase precision ($\varphi_T$).

Although the search phase precision ($\varphi_S$[k]) is described as updated based on the search beamforming error ($\varphi_{S,BE}$[k]) or the search nullforming error ($\varphi_{S,NE}$[k]), this is not intended as a limitation of the present disclosure. It is further contemplated that the search phase precision ($\varphi_S$) may be set to a fixed value. For example, the search phase precision ($\varphi_S$) may be set to a fixed value of 10 degrees, or the like.

The track phase precision ($\varphi_T$) may not vary as a function of the angular waveform [k], and instead may be a fixed value. For example, the track phase precision ($\varphi_T$) may be set to a fixed value of 0.1 degrees, 1 degree, or the like. In embodiments, the track phase precision ($\varphi_T$) may be less than 1 degree.

The step 202, the step 204, and/or the step 206 may be used to compare the common feedback signal to the previous instance of the common feedback signal.

In a step 208, the subsequent search phases ($\Theta_{S,0}$[k+1] to $\Theta_{S,N-1}$[k+1]), the subsequent track phases ($\Theta_{T,0}$[k+1] to $\Theta_{T,N-1}$[k+1]), the subsequent search gains (g$_{S,0}$[k+1] to g$_{S,N-1}$[k+1]), the subsequent track gains (g$_{T,0}$[k+1] to g$_{T,N-1}$[k+1]), the subsequent search signal-to-interference-plus-noise ratio (SINR$_S$[k+1]), and/or the subsequent track signal-to-interference-plus-noise ratio (SINR$_T$[k+1]) may be computed.

The subsequent search phases ($\Theta_{S,0}$[k+1] to $\Theta_{S,N-1}$[k+1]) may be the sum of the search phases ($\Theta_{S,0}$[k] to $\Theta_{S,N-1}$[k]) and the product of the subsequent search step directions (D$_{S,0}$[k+1] to D$_{S,N-1}$[k+1]) and the subsequent search phase precision ($\varphi_S$[k+1]). Similarly, the subsequent track phases ($\Theta_{T,0}$[k+1] to $\Theta_{T,N-1}$[k+1]) may be the sum of the track phases ($\Theta_{T,0}$[k] to $\Theta_{T,N-1}$[k]) and the product of the subsequent track step directions (D$_{T,0}$[k+1] to D$_{T,N-1}$[k+1]) and the subsequent search phase precision ($\varphi_S$[k+1]).

The subsequent search gains (g$_{S,0}$[k+1] to g$_{S,N-1}$[k+1]) and the subsequent track gains (g$_{T,0}$[k+1] to g$_{T,N-1}$[k+1]) may be computed using the subsequent search phases ($\Theta_{S,0}$[k+1] to $\Theta_{S,N-1}$[k+1]) and the subsequent track phases ($\Theta_{T,0}$[k+1] to $\Theta_{T,N-1}$[k+1]), respectively.

The subsequent search signal-to-interference-plus-noise ratio (SINR$_S$[k+1]) may be computed using the subsequent search phase-adjusted-signal power (S$_S$[k+1]) and the subsequent search phase-adjusted-interference power (I$_S$[k+1]), where the subsequent search phase-adjusted-signal power (S$_S$[k+1]) and the subsequent search phase-adjusted-interference power (I$_S$[k+1]) may be computed using the subsequent search gains (g$_{S,0}$[k+1] to g$_{S,N-1}$[k+1]).

The subsequent track signal-to-interference-plus-noise ratio (SINR$_T$[k+1]) may be computed using the subsequent track phase-adjusted-signal power (S$_T$[k+1]) and the subsequent track phase-adjusted-interference power (I$_T$[k+1]), where the subsequent track phase-adjusted-signal power (S$_T$[k+1]) and the subsequent track phase-adjusted-interference power (I$_T$[k+1]) may be computed using the subsequent track gains (g$_{T,0}$[k+1] to g$_{T,N-1}$[k+1]).

The method 200 may loop and use the subsequent search signal-to-interference-plus-noise ratio (SINR$_S$[k+1]) and the subsequent track signal-to-interference-plus-noise ratio (SINR$_T$[k+1]). The loop may include incrementing the angular wavenumber [k] to the subsequent wavenumber [k+1]. Thus, the method 200 may iteratively perform the steps. The method 200 may iteratively performs the steps up to a select angular wavenumber and/or until a select number of beams and/or nulls are formed.

Figure 3:
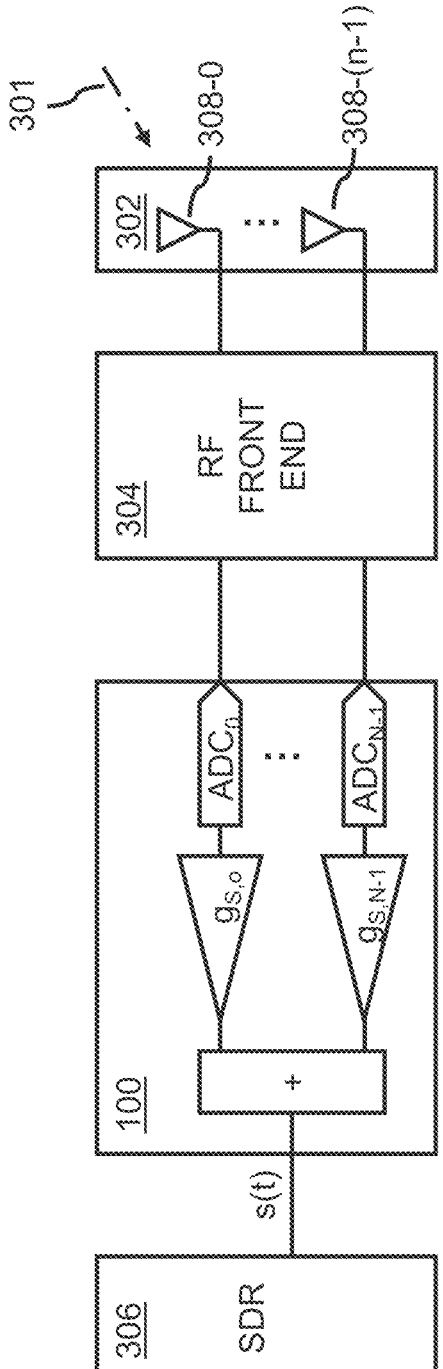
FIG. 3 depicts a simplified block diagram of a radio system including the adaptive digital beamformer, in accordance with one or more embodiments of the present disclosure.

FIG. 3 depicts a radio system 300, in accordance with one or more embodiments of the present disclosure. The radio system 300 may also be referred to as a system for scalable adaptive digital beamforming of a phased antenna array. The radio system 300 may used for any purpose of beamforming, such as, communication, radar, sensing, and the like. The radio system 300 includes one or more components, such as, but not limited to, the adaptive digital beamformer 100, an antenna array 302, a radio-frequency front end (RF front end 304), a software-defined radio (SDR 306), and the like.

The radio system 300 includes the antenna array 302. The antenna array 302 may also be referred to as a phased array. The antenna array 302 include antenna elements 308 (e.g., antenna element 308-0 to antenna element 308-(n−1)). The structural details of the antenna elements 308 are not intended to be limiting. The antenna elements 308 may include any suitable antenna elements, such as, but not limited to, a dipole antenna, and the like. The antenna elements 308 may provide an interface for RF signals 301. The RF signals 301 may be transmitted from and/or received by the antenna elements 308. The RF signals 301 may be wideband RF signals received across a wideband of frequencies.

The radio system 300 may include the RF front end 304. The RF front end 304 is coupled between the antenna array 302 and the adaptive digital beamformer 100. The RF front end 304 receives the RF signals 301. The RF front end 304 converts the RF signals 301 to the analog signals and provide the analog signals to the analog-to-digital converters (ADC$_0$ to ADC$_{N-1}$) for conversion to the in-phase and quadrature signals (s$_0$(t) to s$_{N-1}$(t)). The analog-to-digital converters (ADC$_0$ to ADC$_{N-1}$) may be coupled to the RF front end 304. The RF front end 304 may perform one or more functions, such as, but not limited to, frequency (up/down) conversion, phase shifting, splitting/combining, filtering, amplification, signal mixing, and the like.

The adaptive digital beamformer 100 may be a digital beamformer, in that the phase control takes place inside a beamforming computer/processor, after having sampled the RF signals 301 using the analog-to-digital converters. The received signals are detected and digitized at the element level. The digitized signals are then processed in the adaptive digital beamformer 100 to form a desired beam on transmit and/or receive. The adaptive digital beamformer 100 may be adaptive in that automatic signal-dependent weight adjustment may be performed to reduce unwanted signals and/or emphasize the desired signal.

The radio system 300 may include the SDR 306. The SDR 306 is connected to the adaptive digital beamformer 100. The adaptive digital beamformer 100 may provide a combined digital signal combined digital signal (s(t)) to the SDR 306 after the beamforming loop is finished. The SDR 306 may receive the combined digital signal (s(t)) from the adaptive digital beamformer 100. For example, the SDR 306 may receive the combined digital signal (s(t)) from the track loop 106. The combined digital signal (s(t)) may be the sum of the product of respective of the in-phase and quadrature signals ($s_0$(t) to $s_{N-1}$(t)) and respective of the search gains ($g_{S,0}$[k] to $g_{S,N-1}$[k]). The in-phase and quadrature signals ($s_0$(t) to $s_{N-1}$(t)) may be adjusted by each element in accordance with the search gains ($g_{S,0}$[k] to $g_{S,N-1}$[k]) and forwarded to a central location so each adjusted symbol may be added to the others. For example, the combined digital signal (s(t)) may be defined by the following equation:

$$S(t) = \sum_{i=0}^{N-1} (s_i(t) * g_{S,i}(t))$$

The SDR 306 may perform one or more functions. For example, the SDR 306 may act as a waveform processor, performing actions such as demodulation of the combined digital signal (s(t)). The adaptive digital beamformer 100 may also perform a correlation on the combined digital signal (s(t)). The adaptive digital beamformer 100 may perform a correlation between a known preamble sequence and combined digital signal (s(t)). The correlation may indicate a strong of the beam. When a correlation peak is found, the peak value is provided as common feedback to the adaptive digital beamformer 100.

Although the radio system 300 is described as including the SDR 306, this is not intended as a limitation of the present disclosure. In some embodiments, the adaptive digital beamformer 100 may perform the functions of the SDR 306. For example, the adaptive digital beamformer 100 may act as a waveform processor, performing actions such as demodulation, correlation, and the like of the combined digital signal (s(t)).

Referring generally again to the figures.

Each of the above methods is described as making narrowband phase-only adaptations, but magnitude/phase, true-time delay and channelized adaptations are also suitable with minor adjustments to the adaptation function and some additional feedback in the channelized case. Each method may duplicate the processing described to search for separate beams/nulls simultaneously—this may be particularly useful when trying to receive 2 distinct signals at the same time.

The search does not depend on estimating individual signals to provide feedback related to nulling, instead it estimates the total signal and the total interference, thus optimizing the signal to interference plus noise ratio (SINR). Optimizing the overall SINR, rather than individual signals has not been done in previous iterative beamforming algorithms.

All elements explore the state space at the same rate of change. Previous algorithms based this rate directly on feedback, with additional input from random perturbation and/or channel state information. Exploration at the same rate of change ensures a deliberate search strategy that ensures a beam/null is optimized to within a predefined level of precision.

The randomized element of this algorithm can be interpreted as a direction. The direction of search is only randomized when a beam has begun to weaken. This makes the algorithm much more robust and less sensitive to variations in feedback or in the environment. It prevents the algorithm from "wandering" randomly. Instead, a direction is chosen and is explored until no more improvements can be made from heading in that direction, this direction is not necessarily the gradient line and is therefore not optimal but will ultimately lead to a peak SINR.

The algorithm is designed to "fall back" to a previous state when the SINR decreases, this prevents the system from "missing" a peak by searching too far in any direction.

The algorithm is fast, with an experimentally verification of converge to within 3 dB of maximum value in less than 6000 iterations for 65,000 of the antenna elements 308, and 101 of the targets. For comparison, the MUSIC algorithm with $O(M^3)$ complexity may require 2e14 iterations. The algorithm is also precise, with as little as 0.1-degree error (phase-only beamforming) shown in simulation. The algorithm is also simple with each of the search loop 104 and the track loop 106 requiring 2 multiplies, 1 addition.

The adaptive digital beamformer 100 is configured to perform null steering. Null steering refers to controlling the direction of nulls in the radiation pattern. The nulls are directed towards interfering signals.

Although much of the present disclosure is described in the context of the adaptive digital beamformer 100 receiving signals, this is not intended as a limitation of the present disclosure. The adaptive digital beamformer 100 may also be used to transmit signals. The principles of receiving the signals may be applied to transmitting the signals. In some embodiments, the adaptive digital beamformer 100 may learn the beamformer weights in receive. The digital beamformer may then adapt the signals in transmit based on the beamformer weights in receive. For example, the digital beamformer may adapt the signals in transmit using a complex conjugate of the beamformer weights in receive.

One or more functions of the adaptive digital beamformer 100 may be executed by one or more processors. For example, the search loops 104 and/or the track loops 106 may be executed by one or more processors.

For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the processing hardware may include any device configured to execute algorithms and/or instructions (e.g., program instructions stored in memory). Moreover, processing hardware may include a processor or logic elements suitable for carrying out at least a portion of the steps described in the present disclosure. Therefore, the above description should not be interpreted as a limitation on the embodiments of the present disclosure but merely as an illustration.

The processing hardware may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a housing with the one or more processors.

A module can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the modules can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The modules can include a processor and one or more memory devices for storing instructions that are executable by each of the processors.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward,"

"lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently, "temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:
1. An adaptive digital beamformer comprising:
N-number of analog-to-digital converters ($ADC_0$ to $ADC_{N-1}$), wherein the N-number of analog-to-digital converters ($ADC_0$ to $ADC_{N-1}$) are configured to generate N-number of in-phase and quadrature signals ($s_0(t)$ to $s_{N-1}(t)$);

a search loop, wherein the search loop is configured to multiply the in-phase and quadrature signals ($s_0(t)$ to $s_{N-1}(t)$) with search gains ($g_{S,0}[k]$ to $g_{S,N-1}[k]$), wherein the search gains ($g_{S,0}[k]$ to $g_{S,N-1}[k]$) are complex gains based on search phases ($\Theta_{S,0}[k]$ to $\Theta_{S,N-1}[k]$), wherein subsequent search phases ($\Theta_{S,0}[k+1]$ to $\Theta_{S,N-1}[k+1]$) are defined by the search phases ($\Theta_{S,0}[k]$ to $\Theta_{S,N-1}[k]$) plus a product of search step directions ($D_{S,0}[k]$ to $D_{S,N-1}[k]$) and a search phase precision ($\varphi_S[k]$), wherein the search loop is configured to determine a search signal-to-interference-plus-noise ratio ($SINR_S[k]$), and a track loop, wherein the track loop is configured to multiply the in-phase and quadrature signals ($s_0(t)$ to $s_{N-1}(t)$) with track gains ($g_{T,0}[k]$ to $g_{T,N-1}[k]$), wherein the track gains ($g_{T,0}[k]$ to $g_{T,N-1}[k]$) are based on track phases ($\Theta_{T,0}[k]$ to $\Theta_{T,N-1}[k]$), wherein subsequent track phases ($\Theta_{T,0}[k+1]$ to $\Theta_{T,N-1}[k+1]$) are defined by the track phases ($\Theta_{T,0}[k]$ to $\Theta_{T,N-1}[k]$) plus a product of track step directions ($D_{T,0}[k]$ to $D_{T,N-1}[k]$) and a track phase precision ($\varphi_T$), wherein the track loop is configured to determine a track signal-to-interference-plus-noise ratio ($SINR_T[k]$);

wherein the search step directions ($D_{S,0}[k]$ to $D_{S,N-1}[k]$) and the track step directions ($D_{T,0}[k]$ to $D_{T,N-1}[k]$) are random discrete variables, wherein the search loop is configured to update the subsequent search phases ($\theta_{S,0}[k+1]$ to $\Theta_{S,N-1}[k+1]$) and the search step directions ($D_{S,0}[k]$ to $D_{S,N-1}[k]$) and the track loop is configured to update the subsequent track phases ($\Theta_{T,0}[k+1]$ to $\Theta_{T,N-1}[k+1]$) and the track step directions ($D_{T,0}[k]$ to $D_{T,N-1}[k]$) using the search signal-to-interference-plus-noise ratio ($SINR_S[k]$) and the track signal-to-interference-plus-noise ratio ($SINR_T[k]$) as feedback.

2. The adaptive digital beamformer of claim 1, wherein the adaptive digital beamformer is configured to form B-number of beams and M-number of nulls, where a sum of the B-number of beams and the M-number of nulls is at most one less than the N-number of in-phase and quadrature signals ($s_0(t)$ to $s_{N-1}(t)$).

3. The adaptive digital beamformer of claim 1, wherein the adaptive digital beamformer is configured to parallelize a plurality of search loops and a plurality of track loops.

4. The adaptive digital beamformer of claim 1, wherein phase adjustments and not magnitude adjustments are performed on the in-phase and quadrature signals ($s_0(t)$ to $s_{N-1}(t)$) in the search loop and the track loop.

5. The adaptive digital beamformer of claim 1, wherein the search phase precision ($\varphi_S[k]$) is larger than the track phase precision ($\varphi_T$).

6. The adaptive digital beamformer of claim 1, wherein the search step directions ($D_{S,0}[k]$ to $D_{S,N-1}[k]$) and the track step directions ($D_{T,0}[k]$ to $D_{T,N-1}[k]$) are chosen from a set of $\{-1, 0, or 1\}$.

7. The adaptive digital beamformer of claim 1, wherein the search signal-to-interference-plus-noise ratio ($SINR_S[k]$) and the track signal-to-interference-plus-noise ratio ($SINR_T[k]$) are determined without measuring a channel state information and without measuring an interfering signal to be nulled.

8. The adaptive digital beamformer of claim 1, wherein the search loop is configured to determine a search phase-adjusted-signal power ($S_S[k]$) and a search phase-adjusted-interference power ($I_S[k]$), wherein the search signal-to-interference-plus-noise ratio ($SINR_S[k]$) is the search phase-adjusted-signal power ($S_S[k]$) divided by the search phase-adjusted-interference power ($I_S[K]$);

wherein the track loop is configured to determine a track phase-adjusted-signal power ($S_T[k]$) and a track phase-adjusted-interference power ($I_T[k]$), wherein the track signal-to-interference-plus-noise ratio ($SINR_T[k]$) is the track phase-adjusted-signal power ($S_T[k]$) divided by the track phase-adjusted-interference power ($I_T[k]$).

9. The adaptive digital beamformer of claim 8, wherein the search phase-adjusted-signal power ($S_S[k]$) and the track phase-adjusted-signal power ($S_T[k]$) are powers of a first in-phase and quadrature signal ($s_0(t)$) after phase adjustment by a first search gain ($g_{S,0}[k]$) and after phase adjustment by a first track gain ($g_{T,0}[k]$), respectively;

wherein the search phase-adjusted-interference power ($I_S[K]$) and the track phase-adjusted-interference power ($I_T[k]$) are powers of a remainder of the in-phase and quadrature signals ($s_1(t)$ to $s_{N-1}(t)$) after phase adjustment by the remainder of the search gains ($g_{S,1}[k]$ to $g_{S,N-1}[k]$) and the remainder of the track gains (g respectively.

10. The adaptive digital beamformer of claim 1, wherein the track loop is configured to set the track phases ($\Theta_{T,0}[k]$ to $\Theta_{T,N-1}[k]$) to the search phases ($\Theta_{S,0}[k]$ to $\Theta_{S,N-1}[k]$) and subsequent track step directions ($D_{T,0}[k+1]$ to $D_{T,N-1}[k+1]$) to new random discrete variables if the search signal-to-interference-plus-noise ratio ($SINR_S[k]$) is greater than the track signal-to-interference-plus-noise ratio ($SINR_T[k]$).

11. The adaptive digital beamformer of claim 1, wherein the track loop is configured to set the track phases ($\Theta_{T,0}[k]$ to $\Theta_{T,N-1}[k]$) to respective of previous track phases ($\Theta_{T,0}[k-1]$ to $\Theta_{T,N-1}[k-1]$) and update subsequent track step directions ($D_{T,0}[k+1]$ to $D_{T,N-1}[k+1]$) to new random discrete variables if the track signal-to-interference-plus-noise ratio ($SINR_T[k]$) is less than or equal to a previous track signal-to-interference-plus-noise ratio ($SINR_T[k-1]$);

wherein the track loop is configured to set the subsequent track step directions ($D_{T,0}[k+1]$ to $D_{T,N-1}[k+1]$) to the track step directions ($D_{T,0}[k]$ to $D_{T,N-1}[k]$) if the track signal-to-interference-plus-noise ratio ($SINR_T[k]$) is not less than or equal to the previous track signal-to-interference-plus-noise ratio ($SINR_T[k-1]$).

12. The adaptive digital beamformer of claim 1, wherein the search loop is configured to set the search phases ($\Theta_{S,0}[k]$ to $\Theta_{S,N-1}[k]$) to respective of previous search phases ($\Theta_{S,0}[k-1]$ to $\Theta_{S,N-1}[k-1]$) and set subsequent search step directions ($D_{S,0}[k+1]$ to $D_{S,N-1}[k+1]$) to new random discrete variables if the search signal-to-interference-plus-noise ratio ($SINR_S[k]$) is less than or equal to a previous search signal-to-interference-plus-noise ratio ($SINR_S[k-1]$);

wherein the search loop is configured to set the subsequent search step directions ($D_{S,0}[k+1]$ to $D_{S,N-1}[k+1]$) to the search step directions ($D_{S,0}[k]$ to $D_{S,N-1}[k]$) if the search signal-to-interference-plus-noise ratio ($SINR_S[k]$) is not less than or equal to the previous search signal-to-interference-plus-noise ratio ($SINR_S[k-1]$).

13. The adaptive digital beamformer of claim 12, wherein the search loop is configured to set a subsequent search phase precision ($\varphi_S[k+1]$) to a previous phase precision ($\varphi_S[k-1]$) if the search signal-to-interference-plus-noise ratio ($SINR_S[k]$) is less than or equal to the previous search signal-to-interference-plus-noise ratio ($SINR_S[k-1]$).

14. The adaptive digital beamformer of claim 12, wherein the search loop is configured to update a subsequent search phase precision ($\varphi_S[k+1]$) if the search signal-to-interference-plus-noise ratio ($SINR_S[k]$) is not less than or equal to the previous search signal-to-interference-plus-noise ratio ($SINR_S[k-1]$).

15. The adaptive digital beamformer of claim 14, wherein the search loop is configured to update the subsequent search phase precision ($\varphi_S[k+1]$) based on a maximum of a search beamforming error ($\varphi_{S,BE}[k]$) and a search nullforming error ($\varphi_{S,NE}[k]$).

16. The adaptive digital beamformer of claim 15, wherein the search beamforming error ($\varphi_{BE}[k]$) is defined by real components of a quotient of a search phase-adjusted-signal power ($S_S[k]$) over a input signal power ($S_{IN}[k]$); wherein the search nullforming error ($\varphi_{NE}[k]$) is defined by imaginary components of a quotient of a search phase-adjusted-interference power ($I_S[K]$) over a input interference power ($I_{IN}[k]$); wherein the input signal power ($S_{IN}[k]$) is a power of a first in-phase and quadrature signal ($s_0(t)$); wherein the input interference power ($I_{IN}[k]$)) is a power of a remainder of the in-phase and quadrature signals ($s_1(t)$ to $s_{N-1}(t)$).

17. The adaptive digital beamformer of claim 15, wherein the search loop is configured to normalize the search beamforming error ($\varphi_{BE}[k]$) and the search nullforming error ($\varphi_{NE}[k]$) to the N-number of the in-phase and quadrature signals ($s_0(t)$ to $s_{N-1}(t)$).

18. A radio system comprising:
an adaptive digital beamformer comprising:
N-number of analog-to-digital converters ($ADC_0$ to $ADC_{N-1}$), wherein the N-number of analog-to-digital converters ($ADC_0$ to $ADC_{N-1}$) are configured to generate N-number of in-phase and quadrature signals ($s_0(t)$ to $s_{N-1}(t)$);
a search loop, wherein the search loop is configured to multiply the in-phase and quadrature signals ($s_0(t)$ to $s_{N-1}(t)$) with search gains ($g_{S,0}[k]$ to $g_{S,N-1}[k]$), wherein the search gains ($g_{S,0}[k]$ to $g_{S,N-1}[k]$) are complex gains based on search phases ($\Theta_{S,0}[k]$ to $\Theta_{S,N-1}[k]$), wherein subsequent search phases ($\Theta_{S,0}[k+1]$ to $\Theta_{S,N-1}[k+1]$) are defined by the search phases ($\Theta_{S,0}[k]$ to $\Theta_{S,N-1}[k]$) plus a product of search step directions ($D_{S,0}[k]$ to $D_{S,N-1}[k]$) and a search phase precision ($\varphi_S[k]$), wherein the search loop is configured to determine a search signal-to-interference-plus-noise ratio ($SINR_S[k]$), and
a track loop, wherein the track loop is configured to multiply the in-phase and quadrature signals ($s_0(t)$ to $s_{N-1}(t)$) with track gains ($g_{T,0}[k]$ to $g_{T,N-1}[k]$), wherein the track gains ($g_{T,0}[k]$ to $g_{T,N-1}[k]$) are based on track phases ($\Theta_{T,0}[k]$ to $\Theta_{T,N-1}[k]$), wherein subsequent track phases ($\Theta_{T,0}[k+1]$ to $\Theta_{T,N-1}[k+1]$) are defined by the track phases ($\Theta_{T,0}[k]$ to $\Theta_{T,N-1}[k]$) plus a product of track step directions ($D_{T,0}[k]$ to $D_{T,N-1}[k]$) and a track phase precision ($\varphi_T$), wherein the track loop is configured to determine a track signal-to-interference-plus-noise ratio ($SINR_T[k]$);
wherein the search step directions ($D_{S,0}[k]$ to $D_{S,N-1}[k]$) and the track step directions ($D_{T,0}[k]$ to $D_{T,N-1}[k]$) are random discrete variables, wherein the search loop is configured to update the subsequent search phases ($\Theta_{S,0}[k+1]$ to $\Theta_{S,N-1}[k+1]$) and the search step directions ($D_{S,0}[k]$ to $D_{S,N-1}[k]$) and the track loop is configured to update the subsequent track phases ($\Theta_{T,0}[k+1]$ to $\Theta_{T,N-1}[k+1]$) and the track step directions ($D_{T,0}[k]$ to $D_{T,N-1}[k]$) using the search signal-to-interference-plus-noise ratio ($SINR_S[k]$) and the track signal-to-interference-plus-noise ratio ($SINR_T[k]$) as feedback.

19. The radio system of claim 18, comprising an antenna array and a radio-frequency front end, wherein the radio-frequency front end is coupled between the antenna array and the adaptive digital beamformer, wherein the N-number of analog-to-digital converters ($ADC_0$ to $ADC_{N-1}$) are coupled to the radio-frequency front end.

20. The radio system of claim 18, comprising a software-defined radio, wherein the software-defined radio is configured to receive a combined digital signal (s(t)) from the track loop, wherein the combined digital signal (s(t)) is a sum of the product of respective of the in-phase and quadrature signals ($s_0(t)$ to $s_{N-1}(t)$) and respective of the search gains ($g_{S,0}[k]$ to $g_{S,N-1}[k]$).

* * * * *